United States Patent [19]

Neamtu

[11] Patent Number: 5,458,025
[45] Date of Patent: Oct. 17, 1995

[54] RAZOR BLADE MANUFACTURE

[75] Inventor: Nicolae Neamtu, Quincy, Mass.

[73] Assignee: The Gillette Company, Boston, Mass.

[21] Appl. No.: 210,002

[22] Filed: Mar. 17, 1994

[51] Int. Cl.⁶ ................................. B21K 11/00
[52] U.S. Cl. ................ 76/104.1; 76/DIG. 8; 83/864
[58] Field of Search ................... 76/104.1, 101.1, 76/DIG. 8; 83/864, 51, 332, 430; 223/2, 4, 93; 72/187, 186

[56] References Cited

U.S. PATENT DOCUMENTS

| | | | |
|---|---|---|---|
| 972,436 | 10/1910 | Clark | 76/DIG. 8 |
| 1,727,796 | 9/1929 | Sumner . | |
| 1,732,244 | 10/1929 | Salzman | 76/DIG. 8 |
| 1,942,025 | 1/1934 | Frost | 76/DIG. 8 |
| 2,109,921 | 3/1938 | Leach | 164/17 |
| 2,609,049 | 9/1952 | Rayburn | 164/84.5 |
| 3,080,783 | 3/1963 | Knepshield | 83/479 |
| 3,364,803 | 1/1968 | Senftleben | 83/503 |
| 3,453,914 | 7/1969 | Lemper et al. | 83/8 |
| 3,459,086 | 8/1969 | Reeder, Jr. | 83/425 |
| 3,468,195 | 9/1969 | La Cas | 76/104.1 |
| 3,566,725 | 3/1971 | Sutyak | 83/7 |
| 3,762,249 | 10/1973 | Wheeler et al. | 83/9 |
| 4,011,109 | 3/1977 | Golland et al. | 148/12 B |
| 4,109,500 | 8/1978 | Franek | 72/203 |
| 4,151,941 | 4/1979 | Beaver et al. | 225/97 |
| 4,422,587 | 12/1983 | Primich | 242/56.2 |
| 4,492,135 | 1/1985 | Ginn et al. | 83/155 |

FOREIGN PATENT DOCUMENTS

| | | | |
|---|---|---|---|
| 323007 | 12/1929 | United Kingdom | 76/DIG. 8 |
| 1322151 | 1/1971 | United Kingdom . | |

OTHER PUBLICATIONS

T911,003 Defensive Publication Jun. 5, 1973; L. E. Himelreich, Jr. Apr. 6, 1972.

*Primary Examiner*—Douglas D. Watts
*Attorney, Agent, or Firm*—Owen J. Meegan; Aubrey C. Brine; Donal B. Tobin

[57] ABSTRACT

A process for manufacturing razor blades from a continuous strip of metal stock by stamping a plurality of openings in the strip for precise registry of the blade edge when employed in the razor and then running the stock through a device which partially slits the strip along lines which are precisely located with respect to the edges of the stock and the openings. The strip is then heat treated after which it is run through a device which splits the stock along the previously slit lines to form a plurality of continuous strands containing interconnected blades disposed end to end.

5 Claims, 10 Drawing Sheets

RAZOR BLADE MANUFACTURE

BACKGROUND OF THE INVENTION

The present invention relates to the manufacture of razor blades and more particularly to a method and apparatus for the manufacture of a plurality of razor blades in a continuous strip employing a coil of metallic blade stock.

In the manufacture of razor blades it is common practice to employ a single strand of steel blade stock from which a plurality of blades are produced. The strand of blade stock may be wound in a coil, the stock being of the precise width of the finished product. A plurality of openings are stamped into the strand of blade material defining the precise attach points to be employed in retaining the blade in a cartridge or onto a razor handle, and the strand of blade stock is then generally fed through a heat treating oven to harden the strand of material, after which the strand is sharpened and severed at those locations along the length of the strand effective to produce a plurality of unitary blade members.

While the process is successful in mass producing blades of high quality, an increase in efficiency and speed of production would be made possible by employing a continuous strip of blade stock from which more than one strand of blades could be formed, and maintaining the strip of multiple strands in the rolled form during the manufacturing process, including the heat treatment of the stock.

It is known to manufacture a plurality of strands of material from a single strip which is provided in roll form by initially partially severing the various strands in the strip of material, and then maintaining the strip as a unit until separation into its particular strands is required. A method and device for achieving the partial slitting of a strip of metallic material is disclosed in U.S. Pat. No. 4,170,691, issued Oct. 9, 1979, to John W. Rogers, and entitled Steel Metal Web Handling Method, Apparatus, and Coil Construct.

However, the adaptation of the partial slitting of a continuous strip of material to produce a plurality of blades strands is complicated by the fact that the openings defining the attach points as described above must be precisely located relative to the edge of the strand of the material and each strand must itself be of precise dimension when the strands are separated from the strip of material.

It is therefore an object of the present invention to provide a process for manufacturing a plurality of razor blades in a continuous strip wherein a plurality of strands are formed from the strip having the blade attachment opening precisely aligned with the edge dimensions of each of the strands.

A further object of the invention is to provide a process for manufacturing a plurality of razor blades in a continuous strip which is more efficient and economical than the processes of the prior art.

Yet another object of the invention is to provide a machine for partially slitting a continuous strip of razor blade material having a plurality of registration openings located therein which forms a plurality of strands of interconnected blades, the lines of slitting being precisely located to form strands having the openings precisely aligned with the edge of each strand.

Still a further object of the invention is to provide a machine for splitting a continuous strip of razor blade material which has been partially slit to form a plurality of strands of interconnected blades, which machine is effective to separate each strand at the slit line form in the material.

SUMMARY OF THE INVENTION

The above objects, and other objects which will become apparent as the description proceeds are accomplished by providing a process for manufacturing a plurality of strands of razor blades in a continuous strip which consists of providing a continuous strip of blade material having a width dimension substantially equal to the width dimension of the total plurality of strands. A plurality of openings are formed in the continuous strip, the openings defining precise attach points to be employed in retaining the blade onto a razor cartridge. The continuous strip is then presented, generally in roll form, to a device for partially slitting the strip along equally spaced parallel lines over the length of the strip to form a plurality of linear connected blade strands, one strand being formed between each of the parallel lines and between a parallel line and the edge of the strip. The continuous strip is then subjected to a heat treatment while the blade strands are interconnected one to the other and a separate means is provided for separating the strands to form a plurality of individual, equal width strands having the openings precisely aligned with, and located from, the edges of the strands.

The means for partially slitting the continuous strip of razor blade material having the plurality of registration openings located therein, generally comprises an upper array of slitting knives disposed for rotation about a common axis and a lower array of slitting knives disposed for rotation about its common axis. The axis of the upper array of knives and the lower array of knives are spaced one from the other for forming parallel lines of parting on the continuous strip of blade material passed between the upper array of slitting knives and the lower array of slitting knives. There is also provided means for guiding the edges of the continuous strip of razor blade material to precisely locate the upper array of knives and the lower array of knives relative to the strip edges such that the plurality of strands of interconnected blades are formed by lines of parting which are precisely located relative to one another, and from the strip edge.

The guide means may comprise a pair of edge guide members one disposed on either side of the continuous strip of razor blade material, each of the edge guide members having a planar surface for contacting a respective edge of the strip. The guide member planar surfaces are spaced a distance equal to or less than the width of the continuous strip and the guide means is disposed at least partially between the upper array of slitting knives and the lower array of slitting knives adjacent the lowermost extension of the upper array of slitting knives and the uppermost extension of the lower array of slitting knives.

The device for splitting a continuous strip of razor blade material once having been partially slit, to form a plurality of strands of interconnecting blades, generally comprises a pair of parallel spaced axles each containing at least one rotatable member. One of the rotatable members comprises a substantially V-shaped outer surface extending about the entire periphery of the member and the other of the rotatable members has a slotted outer surface extending about the entire periphery of the member and disposed in facing relation with the V-shaped surface. The members are disposed such that the tip of the V-shaped surface is in alignment with the center of the slot forming the slotted surface. The members are so spaced one from the other as to contact the upper surface of a continuous strip of razor blade material with one of the rotatable members and to contact the lower surface of the strip with the other of the members, when the strip is fed between the rotatable members. Means is provided for guiding the edges of the strip between the rotatable members to locate a partial slit between the tip of the V-shaped surface and the center of the slot forming the slotted surface and the device is effective to split the continuous strip along the partial slits into a plurality of strands of interconnected blades when the strip is moved between the rotatable members.

The guide means generally comprises a pair of parallel facing surfaces spaced for receiving the continuous strip therebetween during movement of the strip through the device, and the parallel facing surfaces are spaced a distance equal to or less than the width of the continuous strip.

The guide means generally extends between the rotatable members to a position adjacent the point of contact of the rotatable members with the continuous strip.

BRIEF DESCRIPTION OF THE DRAWING

The foregoing and other features of the invention will be more particularly described in connection with the preferred embodiment, and with reference to the accompanying drawing, wherein.

DESCRIPTION OF THE PREFERRED EMBODIMENT

Figure 1:
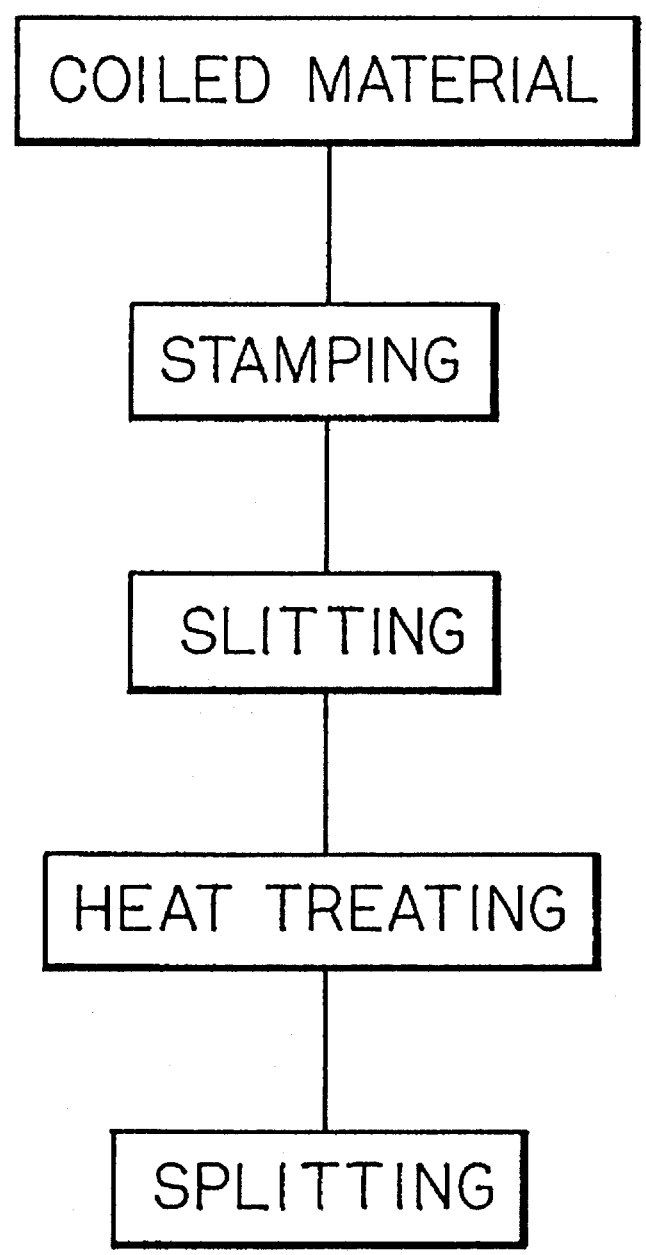
FIG. 1 is a flow chart showing a process for manufacturing razor blades, in which features of the present invention are employed.
Figure 2:
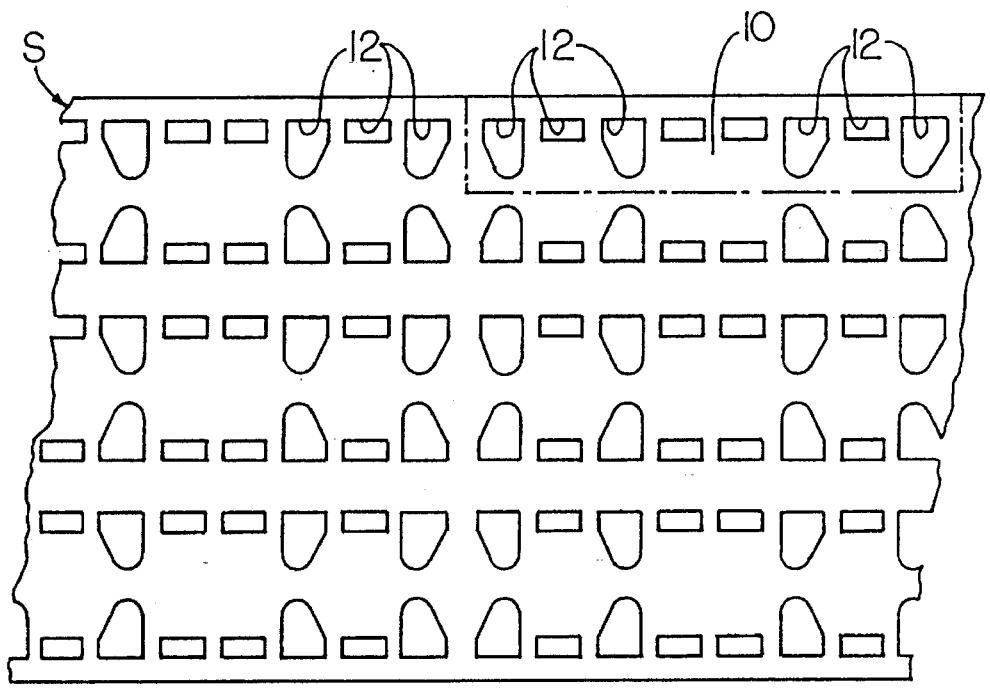
FIG. 2 is a top plan view showing a portion of a continuous strip of razor blade material in the uncoiled state.

Referring to FIG. 1 of the drawing, the present invention involves the five steps set forth, the first of which is supplying a coil of steel razor blade material in the form of a continuous strip having a thickness in the area of 0.004 inches and of a width which has been formed to substantially the exact width dimension to form six strands of blades, as shown more in detail at FIG. 2 of the drawing.

The original coiled material is then further processed by a machine (not shown) having a plurality of punching dies which form the plurality of openings 12 the openings defining the precise attach points to be employed in retaining a blade 10 onto a razor handle or within a razor cartridge. The machine for forming the plurality of openings in the continuous strip S has not been shown in detail as such devices are well known and are presently employed to form the openings in a single strand of blade material. The coil containing the continuous strip S of blade material with the openings 12 formed in it is then passed through a slitting station, heat treated and then subjected to a splitting device wherein the separate strands A, B, C, D, E and F (see FIG. 7) are separated one from the other, each having an exact width dimension, and location of the openings 12, as to be formed in separate razor blades 10 when severed one from the other as shown by the dot-dash lines of FIG. 2.

Figure 3:
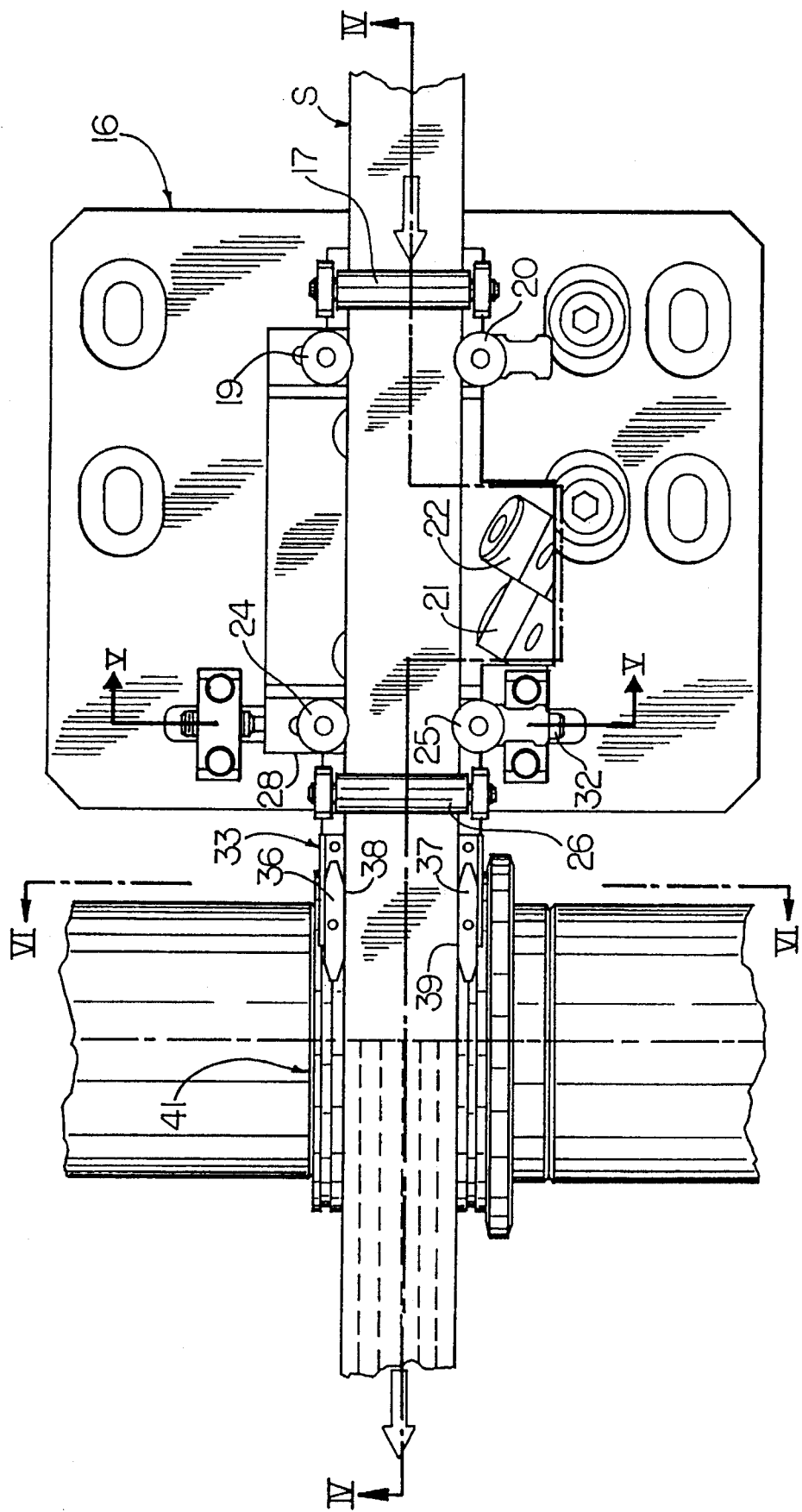
FIG. 3 is a top plan view showing a device for partially slitting the blade material shown in FIG. 2.
Figure 4:
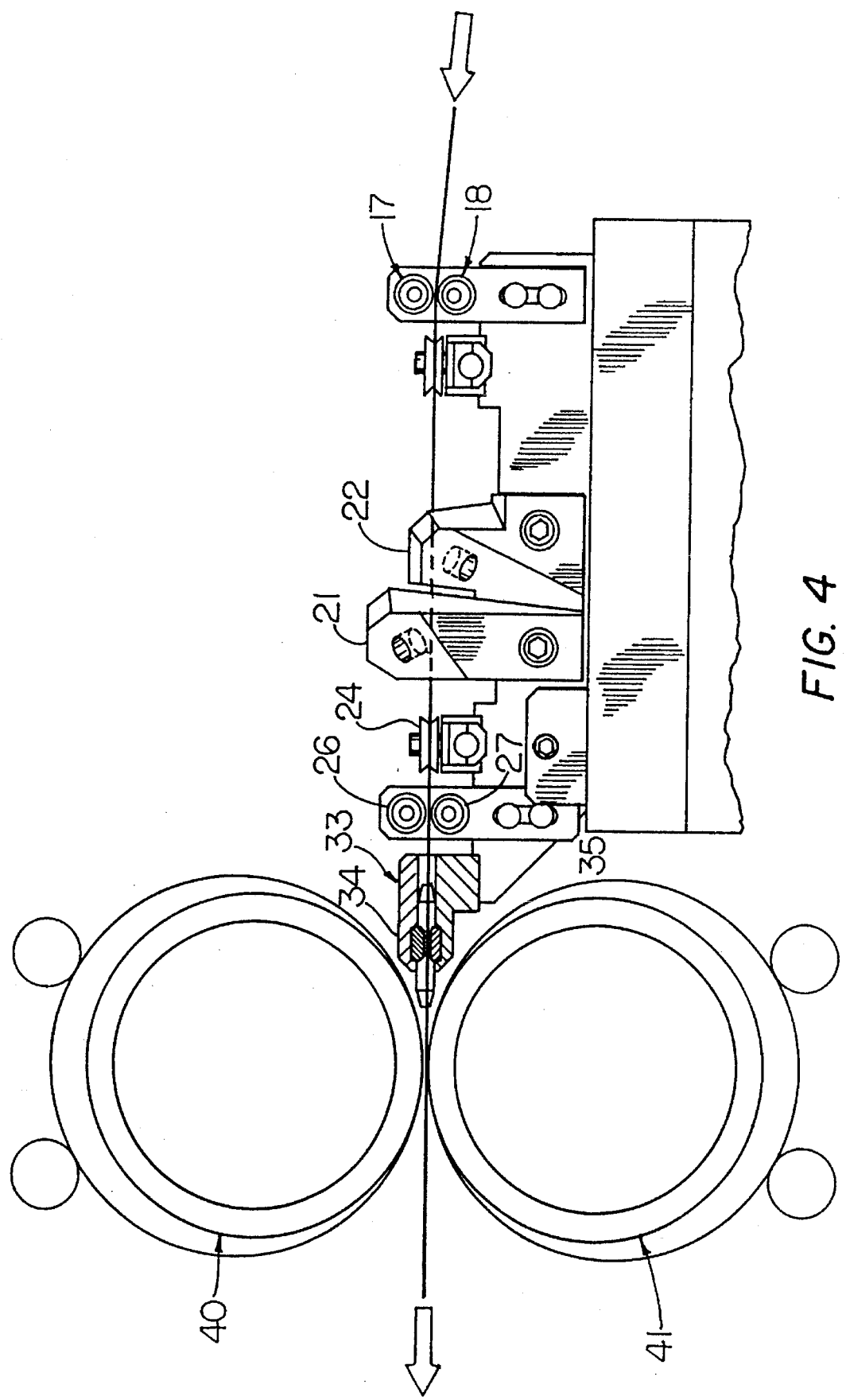
FIG. 4 is an elevational sectional view taken along the line IV—IV of FIG. 3 showing details of the slitting device of FIG. 3.
Figure 5:
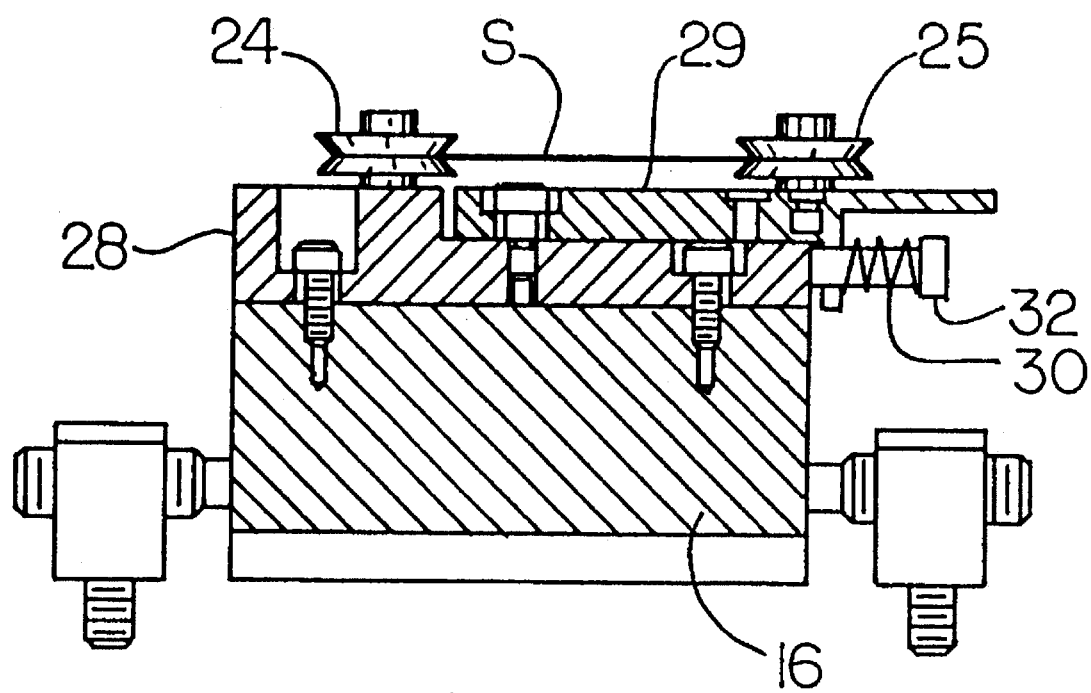
FIG. 5 is an elevational sectional view taken along the line V—V of FIG. 3 showing further details of the slitting device of FIGS. 3 and 4.

Referring now to FIGS. 3 to 5 there is shown a guide assembly of a slitting device 16 for receiving the continuous strip S between a pair of vertical guide rollers 17 and 18 the strip passes by a horizontal guide, a pair of V-shaped guide rollers 19 and 20. The strip S then passes between a pair of air nozzles 21 and 22 which blow air across the upper surface and the lower surface of the strip to ensure that foreign particles are not carried on the surface of the strip through the slitting portion of the machine.

The strip S is then passed through a pair of rotatable guide wheels 24 and 25 prior to entering between a second pair of guide rollers 26 and 27.

As best shown in FIG. 5, the rotatable guide wheel 24 is mounted on a block 28 which is affixed to the base of the slitting device 16A while the rotatable guide wheel 25 is mounted on a sliding block 29 the block 29 being free to move in a direction toward and away from the guide wheel 24. A helical spring 30 is disposed between the head of an adjustment bolt 32 and serves to bias the guide wheel 25 toward the guide wheel 24 to firmly maintain the strip S between the pair of guide wheels. The adjustment bolt 32 may be tightened or loosened to provide more or less compression in the spring 30 and produce a greater or lesser biasing force on the guide wheel 25.

Referring back to FIGS. 3 and 4 the strip S after passing between the guide rollers 26 and 27 enters the guide member 33, the guide member comprising an upper cap 34 and body member 35. Mounted on the body member 35 are a pair of edge guides 36 and 37 each having a planar surface 38 and 39 for contacting a respective edge of the continuous strip S. The edge guides 36 and 37 are manufactured of a hardened material such as carbide and the planar surfaces 38 and 39 are spaced one from the other a distance equal to, or less than, the width of the continuous strip S. It has been found that it is detrimental to the precise forming of the strands A, B, C, D, E and F should the strip be allowed to move from side to side when travelling through the guide member 33, as in the instance where the planar surfaces 38 and 39 are spaced less than the width of the strip S. However, a slight bowing of the strip caused by the surfaces 38 and 39 being in the area of one thousandth or so less than the actual width of the strip is not detrimental to the dimensional integrity of the strands.

Figure 6:
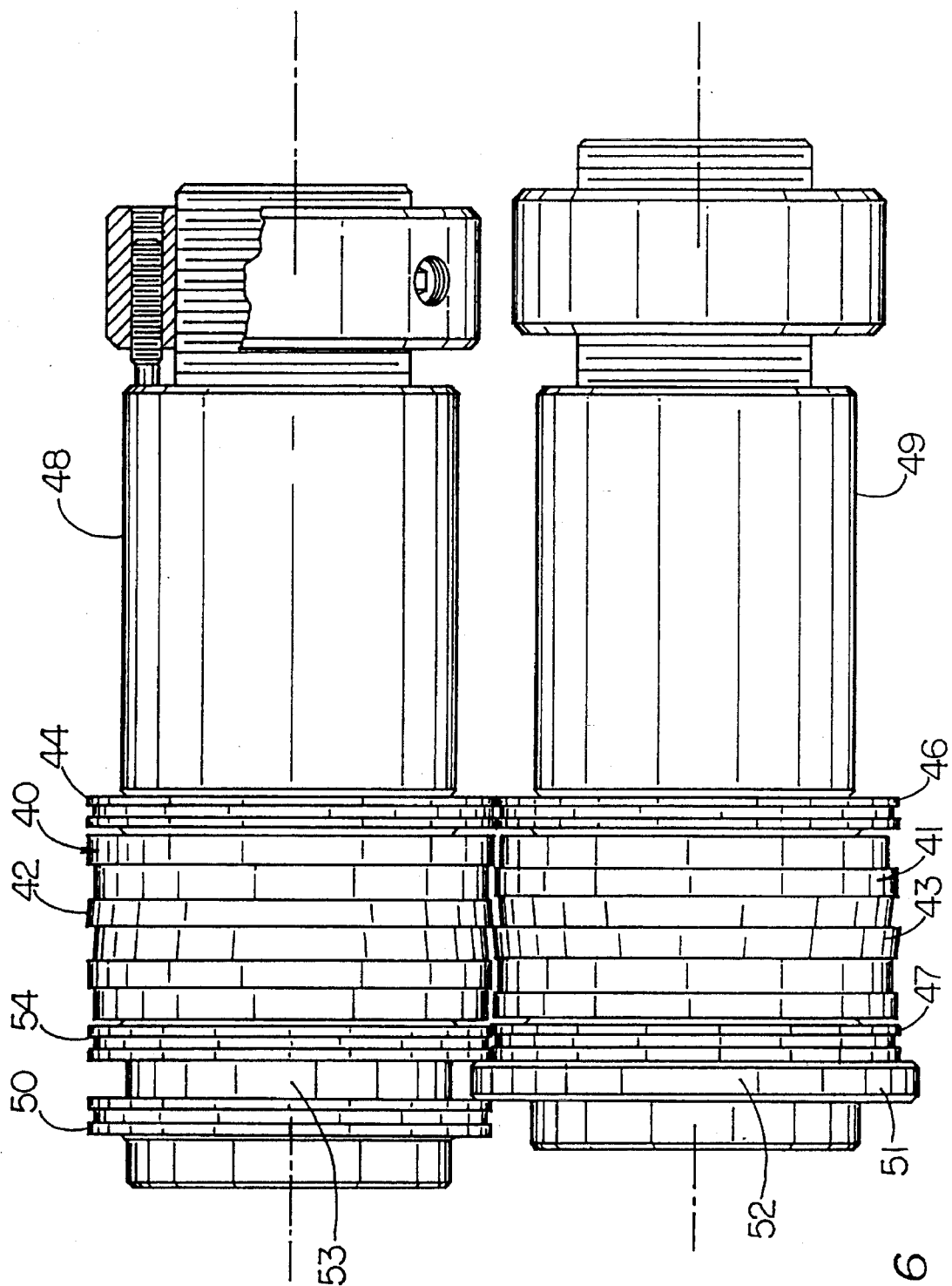
FIG. 6 is a front elevational view taken along the lines VI—VI of FIG. 3, having portions of the structure removed to show the cutter assembly of the device of FIGS. 3, 4 and 5 and taken on an enlarged scale for clarity.

The slitting device further comprises an upper array of slitting knives 40 and a lower array of slitting knives 41, each disposed about its own common axis. As best shown in FIG. 6 the array of slitting knives 40 and the array of slitting knives 41 are disposed with their respective center lines spaced such that five of the knives in each array will produce a partial slitting of a sheet of material passed between the knives while a pair of knives 42 and 43 have one edge which extends beyond the other which in the present embodiment serves to sever the continuous strip S of material into two strips each containing three strands. It should be obvious that if it were desired to maintain the strip S in its width containing six strands the knives 42 and 43 would be so constructed to duplicate the knives 40 and 41 as to partially slit the strip rather than sever it, as in the case of the other five pairs of knives. Also, if it were desired, any of the knives could be so constructed that the mating knife would sever the strip, for instance to create three strips each containing two strands of blades.

While it is known to partially slit material as is accomplished by an array of blades similar to those of the present structure, in the present process the location of the slits as well as the separation of the strip into two separate strips must be done with an accuracy so as to maintain the relationship between the slits produced, and the openings 12 as heretofore discussed.

Still referring to FIG. 6, it will be noted that at each side of the upper array of knives 40 and the lower array of knives 41 there is located rotatable bumper rings 44, 45, 46 and 47. The bumper rings 44, 45, 46 and 47 are manufactured of a hardened steel or carbide material and contact one another at their circumference to provide and maintain the proper clearance between the array of knives 40 and the array of knives 41. In order to ensure that the clearance is maintained by the bumper rings 44, 45, 46 and 47 one of the array of knives 40 or 41 is generally mounted on a fixed shaft, either shaft 48 or 49, while the other is mounted on a movable shaft. The movable shaft 48 or 49 is biased towards the fixed shaft to provide contact between the bumper rings 44, 45, 46 and 47 which then are effective to maintain the proper distance between the slitting knives.

As each of the array of slitting knives 40 and 41 comprise separate discs forming the slitting knives the axial relationship of the cutting edge of each of the discs must be maintained in order to ensure that the edges of each of the knives is in alignment with the opposed knife when producing a partial slitting of the strip S. This is accomplished by providing a pair of pilot rings 50 and 51, the pilot ring 51 having a recessed portion 52 which receives the outwardly extending disc 53 of the ring 50 in interfitting engagement. Each of the pilot rings 50 and 51 are manufactured to close tolerance and are placed on a respective shaft 48 and 49 in contact with the array of knives 40 and 41 and are adjustably located along the respective shaft to ensure that the location of each of the knives in one array of knives remains in alignment with the location of the knives in the opposite array of knives during the slitting process.

Referring back to FIG. 4, it will be seen that the guide member 33 is disposed between the upper array of slitting knives 40 and the lower array of knives 41 and extends as close to the extension of the arrays of splitting knives toward one another to ensure that the strip S is guided towards the slitting knives until just prior to its entry between the knives.

Figures 7, 8:
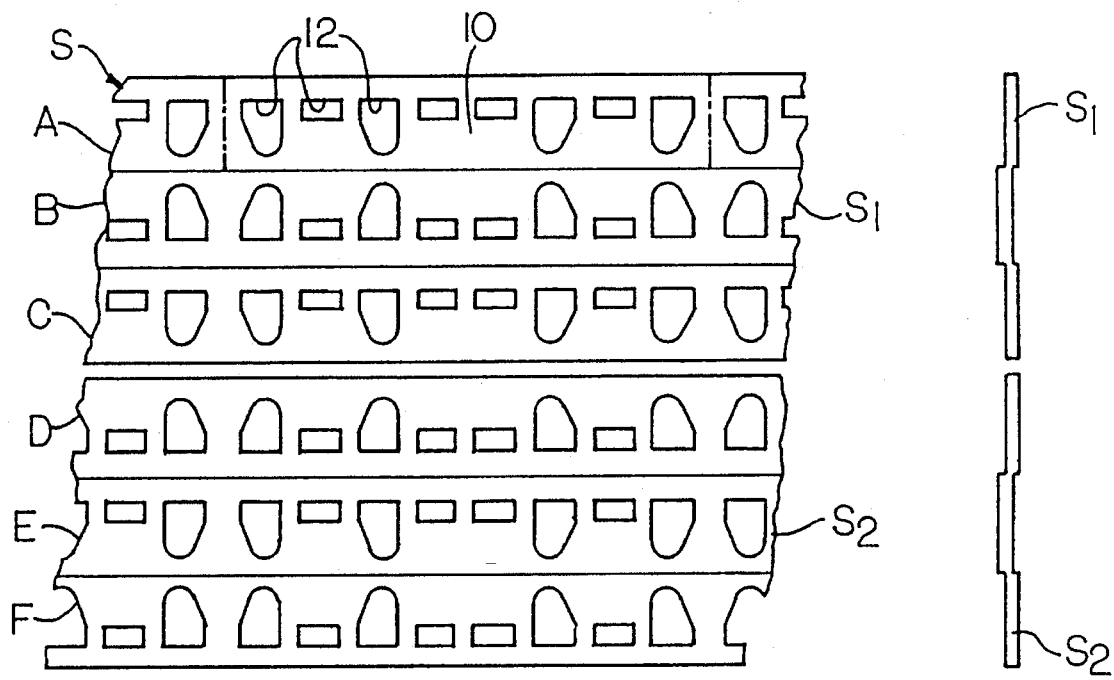
FIG. 7 is a plan view similar to FIG. 2 showing the continuous strip of razor blade material of FIG. 2 after being operated on by the device of FIGS. 3 through 6.
FIG. 8 is a sectional view of the structure of FIG. 7 showing the razor blade material in partially slit form.

After the strip S has been partially slitted, and in the present instance separated into separate strips S1 and S2, the strips are substantially as shown in FIGS. 7 and 8 in configuration. Each of the strips S1 or S2 is subjected to a heat treating process to harden the blade material in a manner which is well known in the art. While the heat treating process will not be discussed in detail, it should be stated that the strips S1 and S2 are generally maintained with their separate strands connected during the entire heat treating process. The strips S1 and S2 are generally maintained in the coiled form before and after heat treating to provide ease of handling.

After the heat treating process it is necessary to split the continuous strip S1 or S2 into its separate strands A, B, C or D, E and F. As shown in FIGS. 9 through 14, the present invention provides a splitting device 55 comprising a first pair of pinch rollers 56 and 57 into which the strip S1 is fed. It will be noted in FIG. 12 that the pinch rollers 56 and 57 are mounted with the pinch roller 57 being fixed and the pinch roller 56 being forced downward toward the roller 57 against the bias of spring 58. As shown in FIG. 10 the strip S1 is further guided in the lateral direction prior to entering and after leaving the pinch roller 56 and 57 by a pair of guide members 60 and 62. As will be seen in FIGS. 13 and 14 the guide member 60 comprises a body 63 and cover plate 64 the two members being held in place by a bolt 65 or other suitable means. The body 63 is provided with a pair of oppositely facing interior guide surfaces 66 and 67 and the body 63 and cover plate 64 when bolted in place provide interior space therebetween to accommodate the continuous strip S1 while the guide surfaces 66 and 67 are spaced a distance apart equal to or less than the width of the strip S1 to ensure contacting the edges of the strip as it is fed through the guide member 60.

Figure 14:
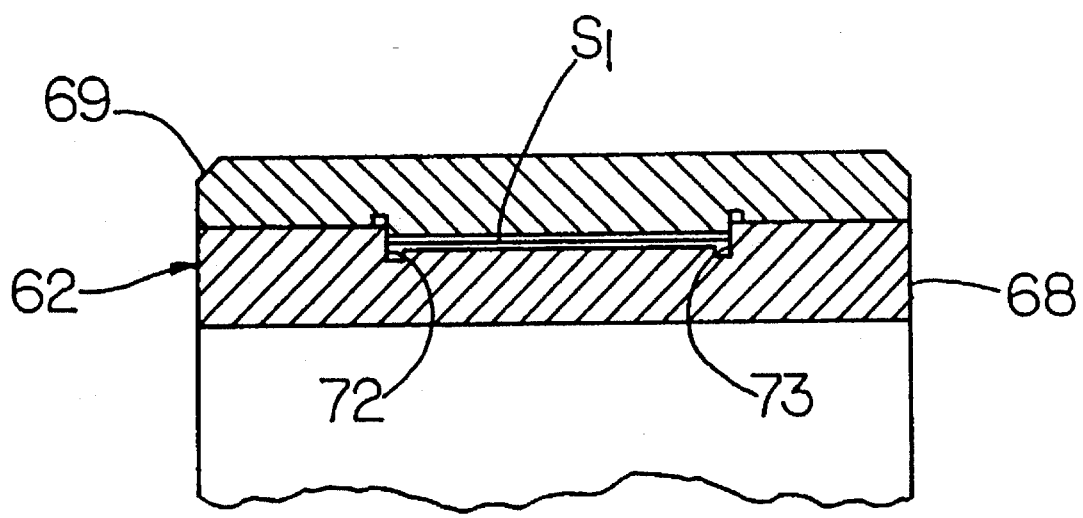
FIG. 14 is a fragmentary elevational sectional view taken along the line XIV—XIV of FIG. 10 showing another portion of the guide means of the device shown in FIGS. 9 through 13.

In a similar manner, the guide member 62 as shown in FIG. 14 comprises a body 68 and cover plate 69 which when bolted together by bolts 70 provide an interior for accommodating the strip S1 between the body and the cover plate. As with the guide member 60, the body 68 has a pair of interior oppositely facing surfaces 72 and 73 the surfaces being spaced apart a distance equal to or less than the width of the continuous strip S1.

Figure 9:
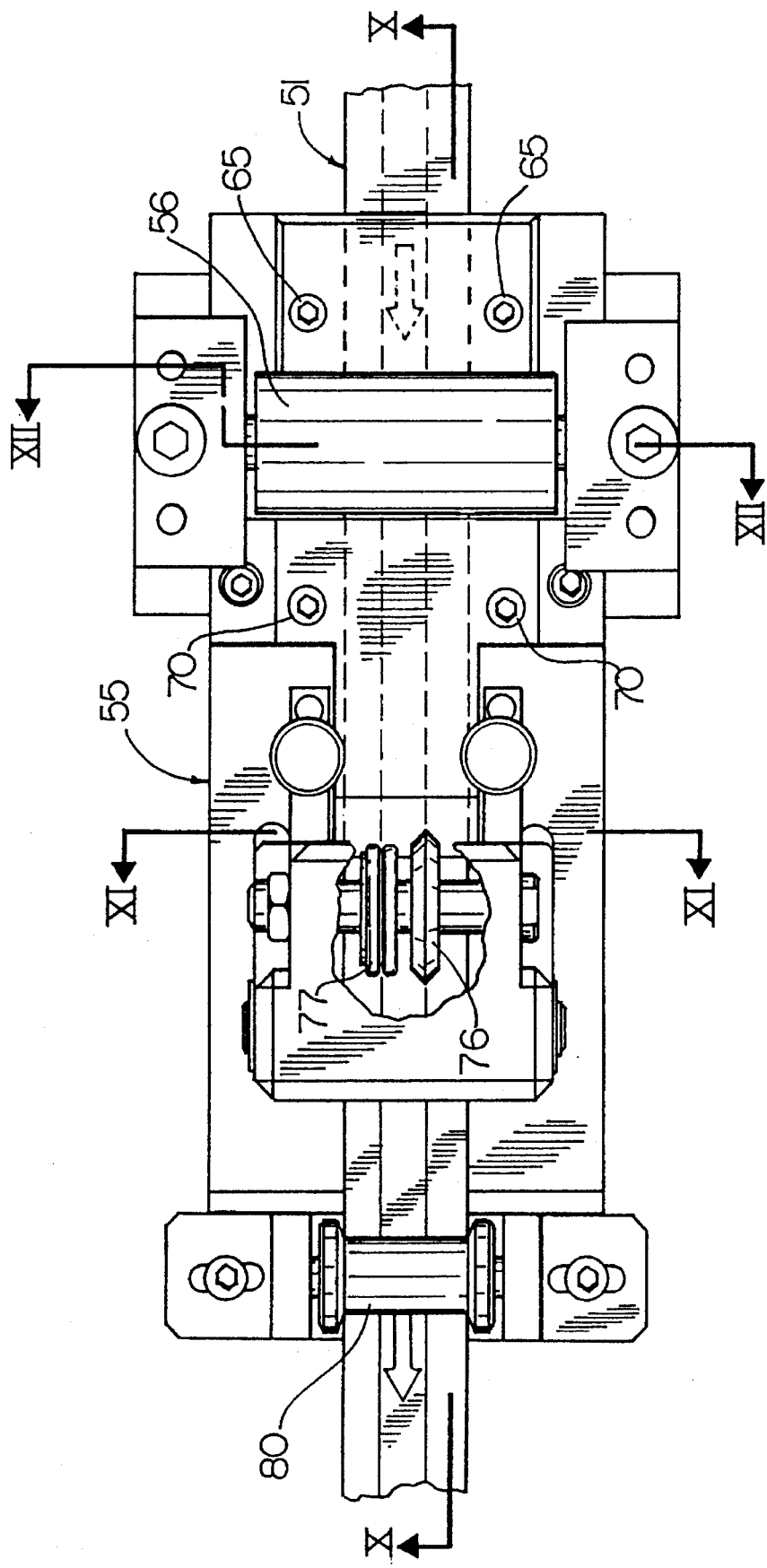
FIG. 9 is a top plan view showing a device for splitting the partially slit razor blade material of FIGS. 7 and 8.
Figure 10:
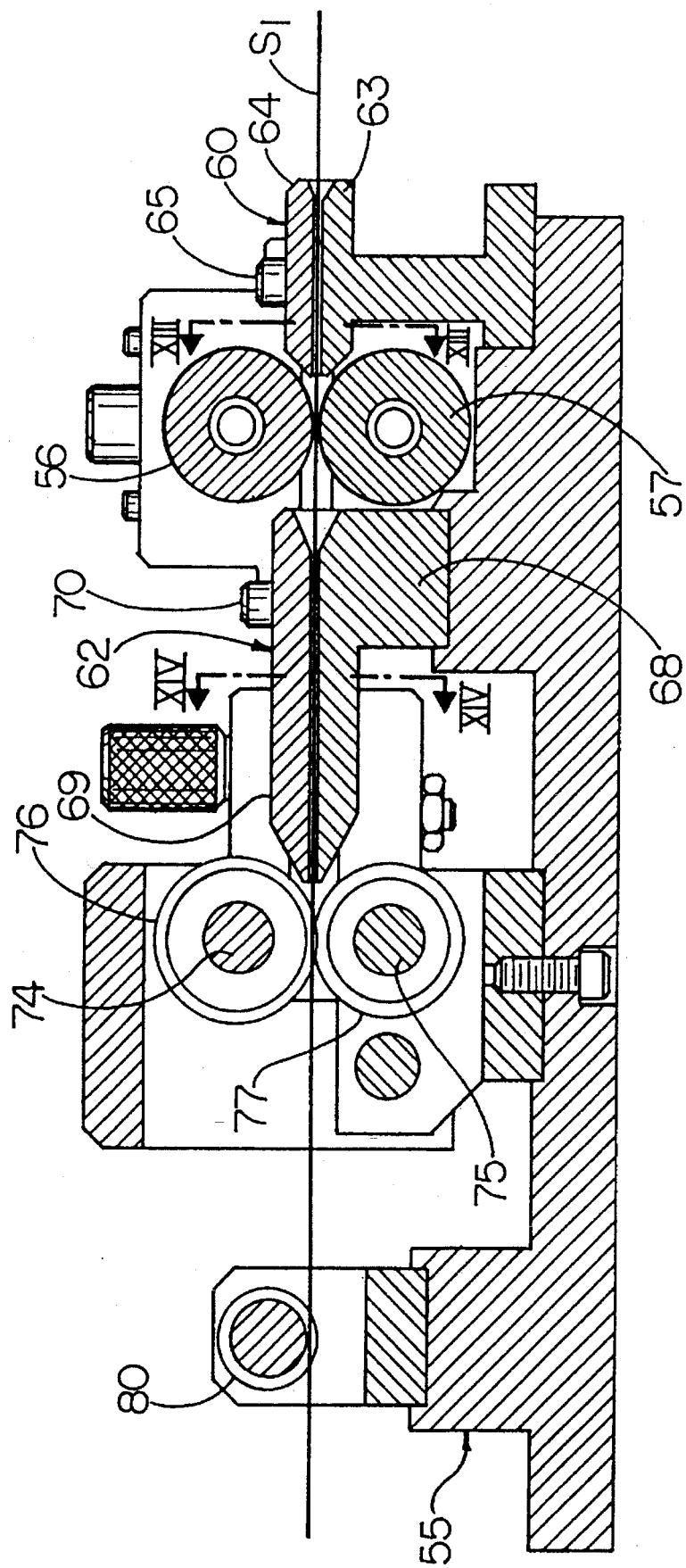
FIG. 10 is an elevational sectional view taken along the line X—X of FIG. 9 showing details of the splitting device of FIG. 9.
Figure 11:
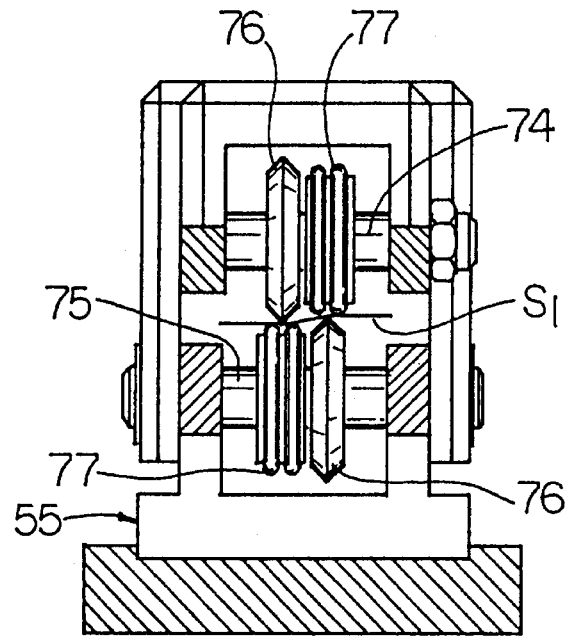
FIG. 11 is an elevational sectional view taken along the line XI—XI of FIG. 9 showing details of the splitting assembly of the device of FIGS. 9 and 10.
Figure 12:
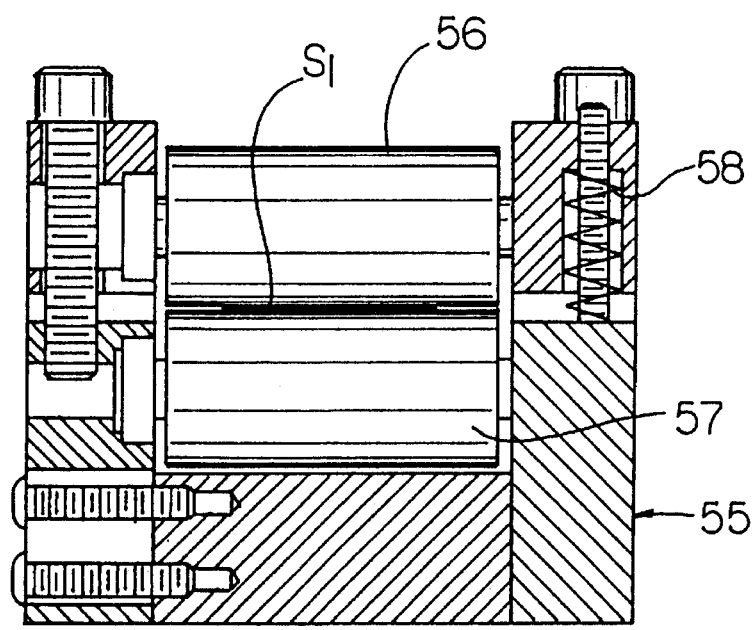
FIG. 12 is an elevational sectional view taken along the line XII—XII of FIG. 9 showing details of the feed structure of the device of FIG. 9.
Figure 13:
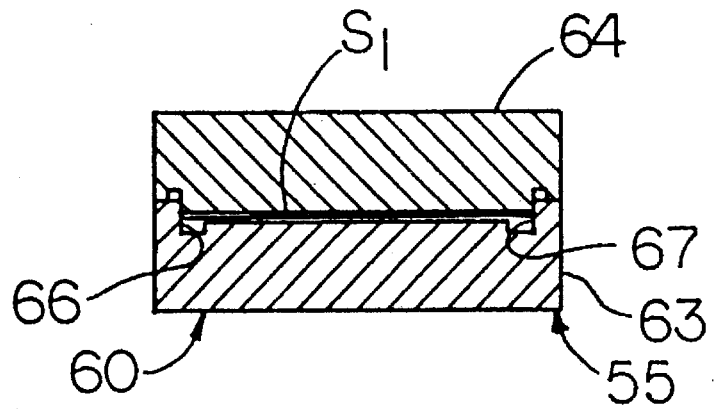
FIG. 13 is a fragmentary elevational sectional view taken along the line XIII—XIII of FIG. 10 showing a portion of the guide means of the device of FIGS. 9 through 12.

As best shown in FIGS. 9 and 10, the splitting device 55 comprises a pair of parallel spaced axles 74 and 75 each axle having a pair of rotatable members mounted thereon. Referring now to FIG. 11, each of the axles 74 and 75 has a rotatable member 76 having a substantially V-shaped outer surface extending about the entire periphery of the member and a second rotatable member 77 having a grooved outer surface, the groove in said outer surface being in alignment with a V-shaped surface of a mating rotatable member 76. The axles 74 and 75 are spaced a distance one from the other such that when a strip S1 is passed between the rotatable members 76 and 77 the rotatable members on the axles 74 contact the upper surface of the strip S1 and the rotatable members on the axle 75 contact the lower surface of the strip. By guiding the edges of the strip such that the partially slit lines substantially conform to the tip of the V-shaped members, the rotatable members 76 and 77 are effective to split the continuous strip into the respective strands of interconnected blades when the strip is moved between the rotatable members. Since the strip S1 contains only two parting lines, the present splitting device 55 comprises only two sets of opposed rotatable members 76 and 77. It should, however, be understood that as many pairs of rotatable members 76 and 77 as there are split lines in the particular continuous strip of material being worked on could be mounted on the shaft 74 and 75 and the edge guide members 60 and 62 would be dimensioned appropriately to guide the strip into the rotatable members 76 and 77 to complete the splitting process.

It should also be observed that the guide member 68 at its forward end extends as far as permissible between the rotatable members 76 and 77 to a point just adjacent the contact between the rotatable members and the surface of the continuous strip S1. Thus, the strip is precisely guided between the rotatable members 76 and 77 to ensure that the lines of partial slitting enter between the rotatable members at the precise point which will cause splitting of the continuous strip into its separate strands.

After passing through the rotatable members 76 and 77 the separate strands continue through a guide roller 80 and then are either rolled into separate rolls containing each strand or may be fed directly to a sharpening device which is effective to form blades from the blade stock material.

From the foregoing it should be evident that with the precise guidance of the continuous strip S of blade stock through the process set forth above, there is no waste of material in that the strands A, B, C, D, E or F of finished razor blade stock are of a precise dimension without the requirement for edge trimming which is often employed when a strip is partially slit and then separated to produce separate strands.

While it is apparent that changes and modifications can be made within the spirit and scope of the present invention, it is my intention, however, only to be limited by the appended claims.

As my invention I claim:

1. A process for manufacturing a plurality of strands of razor blades in a continuous strip which includes the steps of:

providing a continuous strip of blade material having a width dimension substantially equal to the width dimensions of the plurality of strands;

forming a plurality of openings in said continuous strip, said openings defining precise attach points to be employed in retaining a blade onto a razor handle or in a cartridge and then;

partially slitting said strip along equally spaced parallel lines over the length of said strip to form a plurality of linear connected blade strands one strand being formed between each of said parallel lines, and between a parallel line and the edge of said strip;

subjecting said blade strands to heat treatment while interconnected one to the other; and then separating said strands to form a plurality of equal width strands having said openings precisely aligned with, and located from, the edges of said strands.

2. A process as set forth in claim 1 wherein said strip is simultaneously split into two equal width strips during said step of partially slitting said strip along equally spaced parallel lines.

3. A process as set forth in claim 1 wherein said step of partially slitting said strip comprises penetration of said strip to a depth of 20% to 30% of the strip thickness to form said equally spaced parallel lines.

4. A process as set forth in claim 1 wherein said step of splitting of said strip along equally spaced parallel lines comprises passing said strip between a first array of slitting knives disposed for rotation about a common axis and a second array of slitting knives disposed for rotation about a common axis.

5. A process as set forth in claim 4 wherein said axes of said first array of slitting knives and said second array of slitting knives are maintained at a distance, one from the other, to penetrate said strip to a depth of 20% to 30% of the strip thickness.

* * * * *